United States Patent [19]
Schreck et al.

[11] Patent Number: 5,866,246
[45] Date of Patent: Feb. 2, 1999

[54] ORIENTED FILM COMPOSED OF THERMOPLASTIC POLYMER WITH PARTICULATE HOLLOW BODIES, A PROCESS FOR ITS PRODUCTION AND ITS USE

[75] Inventors: Michael Schreck, Frankfurt; Michael Ahlers, Mainz; Frank Osan, Kelkheim, all of Germany

[73] Assignee: Ticona GmbH, Frankfurt, Germany

[21] Appl. No.: 509,961

[22] Filed: Aug. 1, 1995

[30] Foreign Application Priority Data

Aug. 3, 1994 [DE] Germany ............... 44 27 377.0

[51] Int. Cl.⁶ ............................................. B32B 5/16
[52] U.S. Cl. ................ 428/327; 428/308.4; 428/313.5; 428/314.2; 428/314.8
[58] Field of Search .............. 428/327, 308.4, 428/313.5, 314.2, 314.8

[56] References Cited

U.S. PATENT DOCUMENTS

| | | | |
|---|---|---|---|
| 4,377,616 | 3/1983 | Ashcraft et al. | 428/213 |
| 4,496,620 | 1/1985 | Park et al. | 428/323 |
| 4,652,489 | 3/1987 | Crass et al. | 428/337 |
| 4,666,772 | 5/1987 | Schinkel et al. | 428/330 |
| 4,701,369 | 10/1987 | Duncan | 428/313.9 |
| 4,842,960 | 6/1989 | Schinkel et al. | 428/349 |
| 5,091,236 | 2/1992 | Keller et al. | 428/213 |
| 5,176,954 | 1/1993 | Keller et al. | 428/317.9 |
| 5,178,942 | 1/1993 | Frognet et al. | 428/317.9 |
| 5,264,277 | 11/1993 | Frognet et al. | 428/315.5 |
| 5,350,733 | 9/1994 | Campbell et al. | 503/227 |

FOREIGN PATENT DOCUMENTS

| | | |
|---|---|---|
| 0083495 | 7/1983 | European Pat. Off. . |
| 01299832 | 12/1989 | European Pat. Off. . |
| 04306647 | 10/1992 | Japan . |

*Primary Examiner*—H. Thi Le

[57] ABSTRACT

An oriented film composed of thermoplastic polymers is described which comprises at least one vacuole-containing layer. The vacuole-containing layer comprises particulate hollow bodies which are essentially composed of a polymer which is incompatible with the thermoplastic polymer. A process for producing the film is also described.

27 Claims, No Drawings

ORIENTED FILM COMPOSED OF THERMOPLASTIC POLYMER WITH PARTICULATE HOLLOW BODIES, A PROCESS FOR ITS PRODUCTION AND ITS USE

FIELD OF THE INVENTION

The present invention relates to an oriented film comprised of thermoplastic polymers with at least one vacuole-comprising layer. The invention also relates to a process for producing the film and to its use. The invention further relates to the use of particulate hollow bodies.

DESCRIPTION OF THE RELATED ART

Films comprised of thermoplastic polymers are used for many diverse applications and can, broadly, be divided into two groups, namely the transparent and non-transparent types of films. Transparent films show of course the lowest possible opacity, while the non-transparent types show such a high opacity that a meaningful measurement of this parameter is not possible. In the case of non-transparent films, it is therefore their light transmission which is determined. Depending on the degree of light transmission, a distinction is made between translucent and opaque or white films.

Non-transparent films according to the state of the art comprise, in at least one layer, pigments or vacuole-initiating particles or a combination thereof, so that the films show a reduced light transmission as compared with transparent films.

Pigments are particles which essentially do not lead to the formation of vacuoles during the stretching of the film. The coloring action of the pigments is caused by the particles themselves. The term "pigment" is in general tied to a particle size of from 0.01 to at most 1 μm and comprises both so-called "white pigments", which confer a white color upon the films, and "color pigments" which confer a coloration or a black color upon the film.

Opaque films comprise vacuole-initiating particles which are incompatible with the polymer matrix and, on stretching of the films, cause the formation of vacuole-like cavities, the size, nature and number of the vacuoles depending on the material and on the size of the solid particles and on the stretching conditions such as stretching ratio and stretching temperature. The vacuoles reduce the density and provide the films with a characteristic mother of pearl-like opaque appearance which results from scattering of light at the vacuole/polymer matrix interfaces. In general, the mean particle diameter of the vacuole-initiating particles is 1 to 10 μm.

Conventional vacuole-initiating particles are inorganic and/or organic materials incompatible with polypropylene, such as oxides, sulfates, carbonates or silicates, and incompatible polymers such as polyesters or polyamides. The term "incompatible materials" or "incompatible polymers" means that the material or the polymer is present as a separate particle or as a separate phase in the film.

The density of non-transparent polyolefin films can vary within wide limits and depends on the nature and the quantity of the fillers. The density is in general within the range from 0.4 to 1.1 g/cm$^3$.

Such non-transparent films are described in detail in the following publications:

EP-A-0,004,633 describes a heat-sealable, opaque, biaxially oriented plastic film which comprises finely disperse solid, in particular inorganic, particles of a size from 0.2 to 20 μm and possesses at least one heat-sealing layer composed of a propylene/ethylene copolymer. In addition to the inorganic particles, opaque organic particles, for example those composed of crosslinked plastic, are also suitable for providing opacity. The sealability, the gloss and the imprintability of the film are said to be improved as compared with the state of the art. The mechanical properties of the film still require improvement. If inorganic particles are used, the film shows undesired chalking during fabrication and further processing.

EP-A-0,083,495 describes a non-transparent, biaxially oriented film having a glazed appearance and a surface gloss of more than 100% and comprising at least one spherical solids particle per vacuole. Furthermore, the film comprises, on both surfaces of the core layer, a pore-free, transparent, thermoplastic outer layer having a thickness which determines the optical character of the film. Nylon is indicated, for example, as a material for the solids particle. As a rule, the particles have a diameter which is greater than 1 μm. In the case of these films again, the mechanical properties, in particular the film stiffness, still require improvement.

SUMMARY OF THE INVENTION

It is an object of the present invention to provide a non-transparent polyolefin film, in which the translucence or the opacity can be set by simple measures and can be varied within wide limits. It is a further object of the invention to provide non-transparent film comprising a vacuole-comprising layer that still does not chalk.

It is an additional object of the invention to provide a non-transparent film with good mechanical and homogeneous optical properties.

It is a particular object of the invention to provide a non-transparent film with a high stiffness and a high gloss.

It is an additional object of the invention to provide a process for producing a film according to the invention.

It is a further object of invention to provide a method of use for particulate hollow bodies.

It is a further object of the invention to provide a blend comprising thermoplastic polymer and particulate hollow bodies.

In achieving these and other readily apparent objects of the invention there is provided an oriented film which comprises thermoplastic polymers wherein said film comprises at least one vacuole-containing layer wherein said vacuole-containing layer comprises at least one particulate hollow body consisting essentially of a polymer which is incompatible with the thermoplastic polymer.

Other objects of the invention are achieved by providing a process for producing a film according to the invention.

A further object of the invention is achieved by providing a method of using particulate hollow bodies as vacuole-initiating particles in thermoplastic films.

A further object of the invention is achieved by providing a blend comprising thermoplastic polymers and particulate hollow bodies in an amount of about 2 to about 70% by weight, based on the weight of the blend, wherein the par ticulate hollow bodies consist essentially of a polymer being incompatible with the thermoplastic polymer.

A further object of the invention is achieved by a process for producing particulate hollow bodies consisting essentially of cycloolefin copolymers.

A further object of the invention is achieved by a process for producing particulate hollow bodies consisting essentially of cycloolefin copolymers.

DESCRIPTION OF THE PREFERRED EMBODIMENTS

The film according to the invention is a single-layer film or a multilayered film. Single-layer embodiments have a structure like that of the vacuole-containing layer, described below, of the multilayered film. Multilayered embodiments comprise at least two layers and always comprise the vacuole-containing layer and at least one further layer, it being possible for the vacuole-containing layer to form the base layer, an interlayer or the top layer of the multilayered film. In a preferred embodiment, the vacuole-containing layer forms the base layer of the film with at least one top layer and preferably top layers on both sides. Such embodiments may optinally comprise additionally a non-vacuole-containing or vacuole-containing interlayer or interlayers on one or both sides between the vacuole-containing base layer and the top layer(s). In a further preferred embodiment, the vacuole-containing layer forms an interlayer of the multi-layered film, wherein said interlayer is located between the non-vacuole-containing base layer and the top layer. Further embodiments with a vacuole-containing interlayer are of five-layered structure and have vacuole-containing interlayers on both sides. In a further embodiment, the vacuole-containing layer can form a top layer on the vacuole-containing or non-vacuole-containing base layer or interlayer. Within the scope of the present invention, the base layer is that layer which has the largest layer thickness and preferably makes up more than about 40%, in particular more than about 50%, of the total film thickness. The top layer is the layer which forms the outermost layer of the film.

Depending on its intended use, the particular embodiment of the non-transparent film can be translucent, opaque or white-opaque. Within the scope of the present invention, non-transparent films are to be understood as those films whose light transmission according to ASTM-D 1003-77 is not more than about 95%, preferably in the range from about 5 to about 80% e.g. about 50 to about 80%. A distinction is made between translucent, opaque and/or white-opaque types in accordance with their light transmission. Translucent films have a light transmission of 95 to 70%, and opaque or white-opaque types have a light transmission of 69 to 0%, preferably 69–5%, each measured according to ASTM-D 1003-77.

The vacuole-containing layer of the film according to the invention comprises thermoplastic polymer, preferably a polyolefin, in particular a propylene polymer, and particulate hollow bodies composed essentially of a polymer, being incompatible with said thermoplastic polymer and, optionally, further added additives, each in effective quantities. In general, the vacuole-containing layer comprises at least about 60% by weight, preferably about 70 to about 99% by weight, in particular about 80 to about 98% by weight, of the thermoplastic polymer, based on the weight of the vacuole-containing layer. The thermoplastic polymer is also referred to as matrix polymer in the text below.

Within the scope of the present invention, thermoplastic polymers comprise polyolefins composed of olefins having about 2 to about 25 carbon atoms, preferably 2 to 10 carbon atoms, as well as polystyrenes, polyesters and polyamides. Polyolefins such as polypropylene, polyethylene such as HDPE, MDPE, LDPE, LLDPE and VLDPE, as well as polystyrenes are particularly suitable.

Particularly preferred polyolefins are polypropylenes. Suitable polypropylene polymers comprise 90 to 100% by weight, preferably about 95 to about 100% by weight, in particular about 98 to about 100% by weight, of propylene and have a melting point of about 120° C. or higher, preferably about 150° to about 170° C., and in general a melt index of about 0.5 g/10 minutes to about 8 g/10 minutes, preferably about 2 g/10 minutes to about 5 g/10 minutes, at 230° C. and a force of 21.6N (DIN 53 735). Isotactic propylene homopolymer having an atactic content of about 15% by weight and less, copolymers of ethylene and propylene with an ethylene content of about 10% by weight or less, copolymers of propylene with $C_4$–$C_8$-olefins with an olefin content of about 10% by weight or less, ter-polymers of propylene, ethylene and butylene with an ethylene content of about 10% by weight or less and with a butylene content of about 15% by weight or less represent preferred propylene polymers for the vacuole-containing layer, isotactic propylene homopolymer being particularly preferred. The weight percentages indicated relate to the particular polymer.

Furthermore, a blend of the said propylene homopolymers and/or copolymers and/or ter-polymers and other polyolefins, in particular monomers having 2 to 6 carbon atoms, is suitable, the blend comprising at least about 50% by weight, in particular at least about 75% by weight, of propylene polymer. Suitable other polyolefins in the polymer blend are polyethylenes, in particular HDPE, MDPE, LDPE, LLDPE and VLDPE, the content of these polyolefins in each case not exceeding about 15% by weight, based on the polymer blend.

According to the invention, the vacuole-containing layer or, in the case of single-layer embodiments, the film comprises particulate hollow bodies composed of a polymer which is incompatible with the matrix polymer. In general, the vacuole-containing layer comprises at most about 40% by weight, preferably about 1 to about 30% by weight, in particular about 1 to about 20% by weight, of the hollow bodies, in each case based on the weight of the vacuole-containing layer. It has been found that the particulate hollow bodies composed of incompatible polymer surprisingly act in the polymer matrix as a vacuole-initiating filler. During the stretch-orienting of the film, microcracks and microcavities, so-called vacuoles, form between the matrix polymer of the layer and the hollow bodies. In the region of such vacuoles the visible light is refracted. This provides the film with a translucent or opaque appearance and with a reduced density, which make it particularly suitable for certain packaging purposes, in particular in the food stuffs sector.

Within the scope of the present invention, particulate hollow bodies composed of incompatible polymers are to be understood as those particles in which an essentially closed polymer skin encloses an inner volume filled with gas or air. The enclosed volume and the shape of the particles depend on the incompatible polymers used and on the manufacturing process of the particles. The size of the enclosed volume and the shape of the particles can in principle vary within wide limits.

In general, the particulate hollow bodies have a shape which is derived from round hollow bodies of constant diameter. These basic shapes of the spherical or elliptical type are in general deformed to a greater or lesser extent by inward-curving part regions of the surface (so-called indentations or inward curvatures or "concave surface segments"). Usually, an individual particle has about 1 to about 20, preferably about 2 to about 15, in particular about 3 to about 10, such concave surface segments. The individual concave surface segments can be indented to a greater or lesser extent, so that the particle, in a limiting case with very few and poorly pronounced indentations, is essentially a hollow sphere which shows hardly any more concave surface segments. The greater the number of the concave surface segments and the more pronounced the extent of the inward curvatures, the smaller is the volume enclosed by the polymer envelope, so that, in a second limiting case, the insides of the polymer skin touch each other and the enclosed volume tends towards zero. This limiting case is also designed as a completely collapsed particle which then essentially represents only the polymer skin. These collapsed particles have a very highly folded surface without sharp-edge transitions, but with very irregularly formed indentations. The changes of direction of the surface amount to more than about 160° over about 0.1 µm longitudinal dimension on the surface.

In general, the concave surface segments of the particles are curved to such an extent that the inward curvature amounts to at least 10% of the greatest distance between two surface points of the particle (maximum particle diameter). Preferably, the inward curvatures are so pronounced that they amount to about 20 to about 95%, in particular about 30 to about 70%, of the maximum particle diameter.

The distribution of the shapes in a charge of particles can vary within wide limits, i.e. the particles have in general no uniform geometry. Charges have proved to be advantageous in which at least about 5%, preferably about 10 to about 100%, in particular about 60 to about 100% of the particles have at least one concave surface segment, preferably about 1 to about 10 such segments. Charges with particles, which have such strongly pronounced inward curvatures that the insides of the polymer skin touch each other and the enclosed volume tends towards zero, are preferred. The distribution of the shapes can be determined by scanning electron micrographs (SEM) of the particles.

The particles can have a smooth or a rough surface. This feature can be determined, for example, by electron microscope investigations, in particular by scanning electron microscopy (SEM). For this purpose, the particles are prepared by standard methods for electron microscopy and contrasted. Metal vapor depositions, for example of gold, have proved suitable as contrasting agents for SEMs. Smooth surfaces of particles appear on the SEMs as homogeneous areas of largely constant gray hue. Roughnesses due to surface defects are recognizable by differing gray hues. The defects are at a distance from the mean surface of the particles of more than about 100 nm.

The particulate hollow bodies have in general a maximum particle diameter which is within the range from about 0.2 to about 20 µm, preferably about 0.3 to about 7 µm, in particular about 0.5 to about 3 µm, in at least about 90% of the particles.

The particle size distribution is determined by means of photon correlation spectroscopy (PCS), aerosol spectroscopy and/or electron microscopy (SEM). Details relating to these determination methods are described in J. P. Fischer "Progress in Colloid and Polymer Science", 77, pages 180–194, 1988. The bulk density of the particulate hollow bodies is at most about 60%, preferably at most about 30%, in particular at most about 15%, of the density of the polymer used for producing the particulate hollow bodies.

The particulate hollow bodies are composed essentially of a polymer which is incompatible with the matrix polymer of the film layer. Incompatible is also synonymous with disparate and means that this incompatible polymer is not miscible with the matrix polymer and is therefore present in a separate phase which is easily recognizable in scanning electron micrographs or optical micrographs. In the recording by differential scanning colorimetry (DSC), a mixture of two incompatible polymers shows two separate peaks, unless the two polymers by chance have an almost equal glass temperature or an almost equal melting point.

For producing the hollow bodies, in principle all polymers can be employed which are incompatible with the particular matrix polymer used and can be applied by a spray-drying process, i.e. they should be adequately soluble, for example, in a solvent suitable for the particular process. The glass temperature $T_G$ or the softening temperature $T_V$ or the melting point $T_M$ of the incompatible polymer should in general be so high that the particle largely remains dimensionally stable under the temperature conditions usual during film manufacture, i.e. the $T_G$ or $T_M$ should be at least about 5° C., preferably about 15 to about 180° C., in particular about 15 to about 150° C., above the minimum temperature at which extrusion of the matrix polymer is still possible.

When polypropylene is used as the matrix polymer, the extrusion is usually carried out at a temperature from about 220° to about 290° C. The $T_G$ of the matrix polymer incompatible with polypropylene should therefore be within the range from about 225° to about 390° C., preferably about 235° to about 360° C.

In detail, the following incompatible polymers, which meet the abovementioned conditions, are particularly suitable for producing hollow bodies: syndiotactic polystyrene, polyphenylene sulfide (PPS), polyether-ketones (PEK), polyamides (PA), polyethylene terephthalate (PET), polybutylene terephthalate (PBT), polyaramides, polyimides, halogenated polymers, amorphous and partially crystalline cycloolefin polymers and polymers which are prepared by ring-opening polymerization (metathesis polymerization).

The abovementioned polymers are either commercially available products, which can be used directly in the commercially available form for producing the hollow bodies, for example ®ULTRAMID from BASF AG (PA), ®ULTRADUR A from BASF AG (PET), ®Celanex from Hoechst AG (PBT) or ®FORTOON from Hoechst AG (PPS), or the respective polymers and processes for their preparation are the already known state of the art. In detail, suitable amorphous cycloolefin polymers are described in EP-A-0,156,464, EP-A-0,286,164, EP-A-0,475,893 and DE-A-4,036,264. Partially crystalline cycloolefin polymers and processes for their preparation are disclosed in EP-A-0,503,422. A corresponding specification for polynorbornene is U.S. Pat. No. 3,330,815. Metathesis polymers are described in EP-A-0,159,464. All of the above mentioned patents and patent applications are incorporated by reference.

Preferred polymers for producing the hollow bodies are polyethylene terephthalate and polybutylene terephthalate as well as amorphous and partially crystalline cycloolefin polymers.

For producing the particulate hollow bodies, in particular the spray-drying process known per se is suitable, in which the incompatible polymers are dissolved in a suitable solvent or solvent mixture and the solution is subjected to spray drying. If appropriate, other processes, for example emulsion processes or precipitation processes, can also be used for producing the particles according to the invention (M. Bornschein et al., "Die Pharmazie", 44, No. 9, 1989, pages 585 et seq.; Y. Kawashima et al., J. Pharm. Sciences, 81, No. 2, 1992, pages 135 et seq.).

The production of the particles by means of spray drying is preferred and is carried out, for example, according to the principle of nozzle spraying. Co-current nozzle spraying is preferred, in which the directions of the sprayed solution and the direction of the stream of air or gas are equal. For producing the particles by this process, spray dryers made, for example, by Büchi have proved suitable, for example Büchi 190 (Büchi GmbH, Eislingen/Germany).

In spray drying, a solution, emulsion or dispersion of a polymer (material to be sprayed) is fed by means of a delivery pump into a chamber and atomized in a stream of air or gas in such a way that the solvent is wholly or partially removed and the liquid solution droplets are thus converted into solid particles. These particles are passed together with the stream of air or gas into a separator, for example in the form of a cyclone, and precipitated.

The stream of air or gas is drawn by means of an aspirator through the apparatus in such a way that a reduced pressure is generated in the chamber. By controlling the aspirator power, on the one hand the rate of heated air or gas and, on the other hand, the reduced pressure prevailing in the apparatus are controlled. The rate of air or gas drawn through can be adjusted on the apparatus within the range of about 100 to about 800 Nl/h (Nl=normal (STP) liters), and this is also called spray flow. Preferably, the spray flow is within the range of about 500 to about 800 Nl/h. The set reduced pressure is in general within the range of about 10 to about 100 mbar, preferably about 30 to about 70 mbar, below the pressure outside the apparatus.

To ensure that the solvent vaporizes on atomization during the available contact time, the temperature of the stream of air or gas must be above or near to the boiling point of the solvent. This temperature of the stream of air or gas drawn through is termed the inlet temperature. The inlet temperature can vary within wide limits and depends largely on the solvent and polymer used. In general, it is in the range of about 15° to about 250° C., preferably about 60° to about 250° C., in particular about 100° to about 210° C.

The outlet temperature is the temperature of the stream of air or gas with the precipitated particles before entering the cyclone. This outlet temperature results from the inlet temperature, the setting of the aspirator, the setting of the delivery pump and also the concentration of the spray ing solution and the heat of vaporization of the solvent.

It is in general in the range of about 50°–180° C., preferably about 60° to about 120° C. It is in general lower than the inlet temperature.

For the delivery pump which feeds the material to be sprayed into the apparatus, pump outputs from about 100 to about 500 ml/h have proved suitable, in particular about 120 to about 360 ml/h.

Suitable solvents or solvent mixtures for preparing the solution, emulsion or dispersion of polymer are, for example, water, tetrahydrofuran, dichloromethane, toluene, decalin, petroleum ether, furan, DMSO (dimethyl sulfoxide), dioxane, acetone and/or aromatic and aliphatic hydrocarbons or mixtures of these solvents. The solution, emulsion or dispersion of polymer comprises in general about 0.2 to about 25% by weight, preferably about 1 to about 15% by weight, in particular about 3 to about 8% by weight, of polymer, each based on the weight of the solution. Optionally, the polymer solution can comprise further additives, each in effective quantities, for example emulsifiers.

Depending on the particular process parameters, rather spherical hollow bodies having few concave surface segments or none at all, or highly deformed particles are obtained. Spherical hollow bodies are obtained, when the inlet temperature is near the boiling point of the solvent or below and at the same time above or near to the $T_G$ of the dissolved polymer. Under these conditions, the solvent is removed slowly and the formation of the spherical shape is favored. With inversion of this principle, highly deformed particles with numerous concave surface segments are obtained at inlet temperatures which are above the boiling point of the solvent and below the $T_G$ of the polymer.

In addition to the particulate hollow bodies, the vacuole-containing layer can, in a further embodiment, additionally comprise pigments. Within the scope of the present invention, pigments comprise those particles which essentially do not cause formation of vacuoles during stretching. The coloring action of the pigments is caused by the particles themselves. The term "pigment" is in general tied to a particle size of from about 0.01 to at most about 1 μm and comprises both so-called "white pigments", which confer a white color upon the films, and "color pigment" which confer a coloration or a black color upon the film. In general, the mean particle diameter of the pigments is in the range from about 0.01 to about 1 μm, preferably about 0.01 to about 0.7 μm, in particular about 0.01 to about 0.4 μm. The vacuole-containing layer of this embodiment comprises pigments in general in a quantity from about 1 to about 25% by weight, in particular about 2 to about 20% by weight, preferably about 5 to about 15% by weight, each based on the vacuole-containing layer.

Conventional pigments are materials such as, but not limited to, for example, alumina, aluminum sulfate, barium sulfate, calcium carbonate, magnesium carbonate, silicates such as aluminum silicate (kaolin clay) and magnesium silicate (talc), silica and titanium dioxide, amongst which white pigments such as calcium carbonate, silica, titanium dioxide and barium sulfate are preferentially used.

The titanium dioxide particles are composed to the extent of at least 95% by weight of rutile and are preferably used with a coating of inorganic oxides, such as is normally used as a coating for $TiO_2$ white pigment in papers or paints, in order to improve the light fastness. Particularly suitable inorganic oxides include the oxides of aluminum, silicon, zinc or magnesium, or mixtures of two or more of these compounds. They are precipitated from water-soluble compounds, for example an alkali metal aluminate, in particular sodium aluminate, aluminum hydroxide, aluminum sulfate, aluminum nitrate, sodium silicate or silica, in the aqueous suspension. $TiO_2$ particles having a coating are described, for example, in EP-A-0,078,633 and EP-A-0,044,515 which are incorporated by reference herein.

Optionally, the coating also comprises organic compounds having polar and non-polar groups. Preferred organic compounds are alkanols and fatty acids having about 8 to about 30 carbon atoms in the alkyl group, in particular fatty acids and primary n-alkanols having about 12 to about 24 carbon atoms, and also polydiorganosiloxanes and/or polyorganohydrogensiloxanes such as polydimethylsiloxane and polymethylhydrogensiloxane.

The coating on the $TiO_2$ particles is usually composed of about 1 to about 12 g, in particular about 2 to about 6 g, of inorganic oxides and, optionally, about 0.5 to about 3 g, in particular about 0.7 to about 1.5 g, of organic compounds are additionally present, in each case based on 100 g of $TiO_2$ particles. It has proved to be particularly advantageous if the $TiO_2$ particles are coated with $Al_2O_3$ or with $Al_2O_3$ and polydimethylsiloxane.

The density of the films according to the invention can vary within wide limits and depends inter alia on the nature of the matrix polymer and on the nature and quantity of the hollow bodies and of the pigments which may have been added and on the nature, thickness and number of the additional layers. The density of the film is in general below the calculated density of the individual components, i.e. the density of the film is reduced. In general, the films according to the invention have a density of at most about 1.7 g/cm³, and preferably the density is in the range from about 0.4 to about 1.59 or about 1.5 g/cm³, in particular about 0.5 to about 1.2 g/cm³.

The multilayered embodiment, according to the invention, of the film comprises at least one further vacuole-containing or non-vacuole-containing layer which can be the base layer, an interlayer or a sealable or non-sealable top layer of the multilayered film.

The other layer comprises in general about 75 to about 100% by weight, in particular about 90 to about 99.5% by weight, each based on the weight of the other layer, of thermoplastic polymers, preferably olefin polymers having about 2 to about 25, in particular about 2 to about 10, carbon atoms, polystyrenes, polyesters, polyamides and, if appropriate, additives in the effective quantities in each case. Olefin polymers such as polypropylene, polyethylene such as HDPE, MDPE, LDPE, LLDPE and VLDPE and also polystyrenes are particularly suitable. As for the vacuole-containing layer, polyolefins, in particular polypropylene, are also preferred for the other layer.

Examples of preferred propylene polymers are
a propylene homopolymer or
a copolymer of
 ethylene and propylene or
 ethylene and 1-butylene or
 propylene and 1-butylene or
a terpolymer of
 ethylene and propylene and 1-butylene or
a mixture of two or more of the said homo-, co- and terpolymers or
a blend of two or more of the said homo-, co- and terpolymers, if appropriate mixed with one or more of the said homo-, co- and terpolymers,
a propylene homopolymer or
 random ethylene/propylene copolymers with
  an ethylene content from about 1 to about 10% by weight, preferably about 2.5 to about 8% by weight, or
 random propylene/1-butylene copolymers with
  a butylene content from about 2 to about 25% by weight, preferably about 4 to about 20% by weight,
 each based on the total weight of the copolymer, or
  random ethylene/propylene/1-butylene terpolymers with
   an ethylene content from about 1 to about 10% by weight, preferably about 2 to about 6% by weight, and
   a 1-butylene content from about 2 to about 20% by weight, preferably about 4 to about 20% by weight,
  each based on the total weight of the terpolymer, or
 a blend of an ethylene/propylene/1-butylene terpolymer and a propylene/1-butylene copolymer
  with an ethylene content from about 0.1 to about 7% by weight
  and a propylene content from about 50 to about 90% by weight
  and a 1-butylene content from about 10 to about 40% by weight,
each based on the total weight of the polymer blend, being particularly preferred.

The propylene homopolymer used in the other layer or layers comprises about 97 to about 100% by weight of propylene and has a melting point of about 140° C. or higher, preferably about 150° to about 170° C., isotactic homopolypropylene having an n-heptane-soluble content of about 6% by weight and less, based on the isotactic homopolypropylene, being particularly preferred. The homopolymer has in general a melt index of about 1.5 g/10 minutes to about 20 g/10 minutes, preferably about 2.0 g/10 minutes to about 15 g/10 minutes. The indicated weight percentages relate to the polymer.

The copolymers used in the other layer or layers and described above have in general a melt index from about 1.5 to about 30 g/10 minutes, preferably from about 3 to about 15 g/10 minutes. The melting point is in the range from about 120° to about 140° C. The terpolymers used in the layer or layers have a melt index in the range from about 1.5 to about 30 g/10 minutes, preferably from about 3 to about 15 g/10 minutes, and a melting point in the range from about 120° to about 140° C. The blend of co- and terpolymers, described above, has a melt index from about 5 to about 9 g/10 minutes and a melting point from about 120° to about 150° C. All the melt indices given above are measured at 230° C. and at a force of 21.6N (DIN 53 735). Other layers of co- and/or ter-polymers form preferably the top layers of sealable embodiments of the film.

In principle, the other layer can comprise the pigments described above for the vacuole-containing layer in corresponding quantities. Embodiments with a vacuole-containing other layer comprise, analogously to the vacuole-containing layer described above, particulate hollow bodies as vacuole-initiating filler.

In a further advantageous embodiment, the propylene polymers preferably used in the vacuole-containing layer and/or other layer and/or base layer and/or interlayer and/or top layer can be partially degraded by the addition of organic peroxides. A measure of the degree of degradation of the polymer is the so-called degradation factor A, which indicates the relative change in the melt index of the polypropylene according to DIN 53 735, based on the starting polymer.

$$A = \frac{MFI_2}{MFI_1}$$

$MFI_1$=Melt index of the propylene polymer before the addition of the organic peroxide
$MFI_2$=Melt index of the propylene polymer degraded by the peroxide mechanism According to the invention, the degradation factor A of the propylene polymer used is in the range from about 3 to about 15, preferably about 6 to about 10.

Particularly preferred organic peroxides are dialkyl peroxides, an alkyl radical having to be understood as one of the usual saturated straight-chain or branched lower alkyl radicals having up to six carbon atoms. In particular, 2,5-dimethyl-2,5-di(t-butylperoxy)-hexane or di-t-butyl peroxide are preferred.

The total thickness of the film can vary within wide limits and depends on the intended use. The preferred embodiments of the film according to the invention have overall thicknesses from 5 to 200 μm, preferably from about 10 to about 100 μm and especially from about 20 to about 90 μm being preferred. The thickness of the interlayer or interlayers, which may be present, is about 2 to about 40 μm, independently of one another in each case, interlayer thicknesses from about 3 to about 20 µm, in particular about 3 to about 10 µm, being preferred. The indicated values relate in each case to one interlayer. This thickness of the top layer or layers is selected independently of the other layers and is preferably in the range from about 0.1 to about 10 µm, in particular about 0.3 to about 5 µm, preferably about 0.5 to about 2 µm, and top layers applied to both sides can be identical or different with respect to thickness and composition. The thickness of the base layer results correspondingly from the difference of the overall thickness of the film and the thickness of the applied top layer(s) and interlayer(s) and can therefore vary within wide limits analogously to the overall thickness.

In order to improve certain properties of the preferred film composed of polypropylene according to the invention even further, both the single-layer film and the vacuole-containing layer, the other layer, the base layer(s), the interlayer(s) and/or the top layer(s) of the multilayered film can, in each case in an effective quantity, comprise additives, if desired low-molecular hydrocarbon resins compatible with the polymer and/or preferably antistatic agents and/or incompatible anti-blocking agents and/or lubricants and/or stabilizers and/or neutralizing agents as well as anti-blocking agents. All the quantity data in the explanation below in percent by weight (% by weight) relate in each case to the layer or layers, to which the additive can have been added.

A low-molecular resin is preferably added, for example, for improving the water vapor permeability (WVP) and for improving the film stiffness. Hydrocarbon resins are low-molecular polymers whose molecular weight is in general in the range from about 300 to about 8,000, preferably about 400 to about 5,000, and most preferably about 500 to about 2,000. The molecular weight of the resins is thus markedly lower than that of the propylene polymers which form the main component of the individual film layers and in general have a molecular weight of more than about 100,000. The content of the resin is in a range from about 1 to about 30% by weight, preferably about 2 to about 10% by weight. The softening point of the resin is between about 60° and about 180° C. (measured according to DIN 1995-U4, corresponding to ASTM E-28), preferably above about 100 to about 160° C. Amongst the numerous low-molecular resins, the hydrocarbon resins are preferred, and in particular in the form of the petroleum resins, styrene resins, cyclopentadiene resins and terpene resins (these resins are described in Ullmanns Encyklopädie der techn. Chemie [Ullmann's Encyclopedia of Industrial Chemistry], 4th edition, volume 12, pages 525 to 555). Suitable petroleum resins are described in numerous publications such as, for example, EP-A-0,180,087, which is incorporated herein by reference.

Preferred antistatic agents are alkali metal alkane sulfonates, polyether-modified, i.e. ethoxylated and/or propoxylated polydiorganosiloxanes (polydialkyl-siloxanes, polyalkylphenylsiloxanes and the like) and/or the essentially straight-chain and saturated aliphatic tertiary amines with an aliphatic radical having about 10 to about 20 carbon atoms, which are substituted by ω-hydroxy-($C_1$–$C_4$)-alkyl groups, N,N-bis-(2-hydroxyethyl)-alkylamines having about 10 to about 20 carbon atoms, preferably about 12 to about 18 carbon atoms, in the alkyl radical being particularly suitable. The effective quantity of antistatic agent is in the range from about 0.05 to about 0.3% by weight.

Lubricants are higher aliphatic acid amides, higher aliphatic acid esters, waxes and metal soaps as well as polydimethylsiloxanes. The effective quantity of lubricant is in the range from about 0.1 to about 3% by weight. Particularly suitable is the addition of higher aliphatic acid amides in the range from about 0.15 to about 0.25% by weight in the base layer and/or in the top layers. A particularly suitable aliphatic acid amide is erucic acid amide. The addition of polydimethylsiloxanes in the range from about 0.3 to about 2.0% by weight is preferred, in particular of polydimethylsiloxanes having a viscosity from about 10,000 to about 1,000,000 mm$^2$/s.

The stabilizers used can be the conventional compounds having a stabilizing action for polymers, in particular those which are effective for ethylene polymers, propylene polymers and other olefin polymers. The added quantity thereof is between about 0.05 and about 2% by weight. Phenolic stabilizers, alkali metal/alkaline earth metal stearates and/or alkali metal/alkaline earth metal carbonates are particularly suitable. Phenolic stabilizers are preferred in a quantity from about 0.1 to about 0.6% by weight, in particular about 0.15 to about 0.3% by weight, and with a molecular mass of more than 500 g/mol. Pentaerythritol tetrakis-3-(3,5-di-tertiarybutyl-4-hydroxyphenyl)-propionate or 1,3,5-trimethyl-2,4,6-tris(3,5-di-tertiary-butyl-4-hydroxybenzyl) benzene are particularly advantageous.

The anti-blocking agents are preferably added to the top layers. Suitable anti-blocking agents are inorganic additives such as silica, calcium carbonate, magnesium silicate, aluminum silicate, calcium phosphate and the like and/or incompatible organic polymers such as COC, polyamides, polyesters, polycarbonates and the like, and benzoguanamine/formaldehyde polymers, silica and calcium carbonate are preferred. The effective quantity of anti-blocking agent is in the range from about 0.01 to about 10% by weight, preferably about 0.05 to about 5% by weight. The mean particle size is between 1 and 6 µm, in particular 2 and 5 µm, particles having a spherical shape, as described in EP-A-0,236,945 and DE-A-3,801,535, being particularly suitable.

Neutralizing agents are preferably calcium stearate and/or calcium carbonate of a mean particle size of at most 0.7 µm, an absolute particle size of less than about 10 µm and a specific surface area of at least about 40 m$^2$/g. In general, the neutralizing agent is added in a quantity from about 0.02 to about 0.1% by weight.

The invention also relates to a process for producing the film according to the invention by the extrusion process known per se. Within the scope of this process, the procedure is such that the thermoplastic polymers or the polymer blend, together with the particulate hollow bodies, are compressed in an extruder and heated, the melts corresponding to the film or to the individual layers of the film are then extruded or co-extruded through a sheet die, the film thus obtained is drawn off for solidification on one or more roller(s), the film is then oriented, the oriented film is thermofixed and, optionally, corona-treated or flame-treated on the surface intended for treatment.

For the purpose of illustrating the invention, the production of the film according to the invention is described in more detail below using the example of the polypropylene film.

In the production of polyolefin films, in particular polypropylene films, it has proved to be particularly advantageous to hold the draw-off roller or rollers, by means of which the extruded film is also cooled and solidified, at a temperature from 10° to 90° C., preferably 20° to 60° C.

The initial film thus obtained is stretched preferably longitudinally and transversely to the direction of extrusion, which causes biaxial orienting of the molecule chains. The biaxial orienting can be carried out simultaneously or successively, it being particularly advantageous in successive biaxial stretching first to stretch longitudinally (in the machine direction) and then transversely (perpendicularly to the machine direction). The film is preferably stretched about 4:1 to about 7:1 in the longitudinal direction and preferably about 6:1 to about 11:1 in the transverse direction. The longitudinal stretching will advantageously be carried out by means of two rollers running at different speeds, corresponding to the desired stretching ratio, and the transverse stretching by means of a corresponding tenter frame.

The temperatures at which the longitudinal and transverse stretching of the polypropylene films are carried out can vary within a wide range. In general, the longitudinal stretching is carried out at about 90° to about 150° C., preferably about 100° to about 140° C., and transverse stretching is carried out at about 140° to about 190° C., preferably about 150° to about 180° C.

The biaxial stretching of the polypropylene film is followed by its thermofixing (heat treatment), the film being held for about 0.5 to 10 seconds at a temperature from about 110° to about 130° C. Subsequently, the film is wound up in the conventional manner on a winding-up device.

Optionally one or both surface(s) of the film can, as mentioned above, be corona- or flame-treated after the biaxial stretching by one of the known methods, an electric direct voltage being applied between a burner (negative pole) and a cooling roller for a flame treatment with a polarized flame (cf. U.S. Pat. No. 4,622,237). The level of the applied voltage is between about 500 and about 3,000 V, preferably in the range from about 1,500 to about 2,000 V. The ionized atoms obtain an increased acceleration by the applied voltage and impinge onto the polymer surface with a higher kinetic energy. The chemical bonds inside the polymer molecule are more easily broken, and the formation of the free radicals proceeds faster. The thermal stress on the polymer is in this case far lower than in the case of the standard flame treatment, and films can be obtained, in which the sealing properties of the treated side are even better than those of the untreated side.

For the alternative corona treatment, the film is passed through between two conductor elements serving as electrodes, such a high voltage, in most cases an alternating voltage (about 10,000 V and 10,000 Hz), being applied between the electrodes that spray discharges or corona discharges can take place. The air above the film surface is ionized by the spray discharge or corona discharge and reacts with the molecules of the film surface, so that polar inclusions are produced within the substantially non-polar polymer matrix. The treatment intensities are within the conventional range, 38 to 45 mN/m being preferred.

The particulate hollow bodies are incorporated into the film either in pure form or as a granulated concentrate (masterbatch), by premixing the granules of thermoplastic polymer or powder with the particulate hollow bodies in pure form or as a masterbatch and then feeding the mixture to the extruder. In the extruder, the components are heated to the processing temperature. In general, the extrusion temperature is at least about 5° C., preferably about 15° to about 180° C., in particular about 15° to about 150° C., below the $T_G$ or $T_V$ of the incompatible polymer from which the particulate hollow body has been prepared.

The particulate hollow bodies act during the orienting of the film in a manner similar to the particulate vacuole-initiating fillers known from the literature. These conclusions are suggested by scanning electron micrographs of the oriented film, which show that the film has vacuoles in which the particulate hollow bodies composed of incompatible polymer are present.

The film according to the invention is distinguished by a reduced density at the same content of fillers, such as, for example, a film which is produced with $CaCO_3$ or spherical PBT and which is used according to the state of the art. In this way, it is possible to reduce the filler content as compared with known films, without thereby losing the desired low density. Furthermore, it has been found that it has been possible, surprisingly, markedly to improve the stiffness of the film. Furthermore, the film does not show any undesired chalking on cutting and processing.

The manufacturing costs of the film can be lowered as a result of reduced use of vacuole-initiating particles.

The invention will now be explained in even more detail by reference to embodiment examples.

A. Preparation of the incompatible polymer

EXAMPLE 1

A clean and dry 1.5 dm$^3$ polymerization reactor with a stirrer was purged with nitrogen and then with ethylene, and filled with a solution of 712 g of norbornene in 150 cm$^3$ of toluene. With stirring, the reactor was then brought to a temperature of 90° C., and 1 bar of ethylene was injected.

5 cm$^3$ of a solution of methylaluminoxane in toluene (10.1% by weight of methylaluminoxane having a molar mass of 1300 g/mol according to cryoscopic determination) were then metered into the reactor and the mixture was stirred for 15 minutes at 90° C., the ethylene pressure being held at 1 bar by further injection of ethylene (saturation of the solution with ethylene). In parallel with this, 5.5 mg of isopropylene (cyclopentadienyl) (1-indenyl) zirconium-dichloride were dissolved in 5 cm$^3$ of methylaluminoxane solution in toluene (concentration and quality as above) and preactivated by leaving it standing for 15 minutes. The solution of the complex was then metered into the reactor. With stirring (750 rpm), the polymerization was then carried out for 2 hours at 90° C., the ethylene pressure being held at 1 bar by further injection. The reactor content was then rapidly discharged into a stirred vessel comprising 10 cm$^3$ of isopropanol. This mixture was added dropwise to 2 dm$^3$ of acetone, and the suspended polymeric solid was then filtered off. The polymer, which had been filtered off, was then put in 1000 cm$^3$ of a mixture of two parts of 3-normal hydrochloric acid and one part of ethanol, and this suspension was stirred for 2 hours. The polymer was then filtered off again, washed with water until neutral and dried for 15 hours at 80° C. and 0.2 bar. This gave a product quantity of 165 g. A glass temperature $T_g$ of 276° C. was measured on the product. The viscosity number was 52 ml/g.

EXAMPLE 2

Example 1 was repeated, but using 4-($\eta^5$-cyclopentadienyl)-4,7,7-trimethyl-($\eta^5$-4,5,6,7-tetrahydroindenyl)dichlorozirconium as metallocene. The reaction time was 1 hour. This gave 325 g of polymer. The glass temperature of the polymer was 256° C. The viscosity number was 25 ml/g.

B. Production of the particulate hollow bodies

EXAMPLES 3–5

In a spray dryer (Mini Spray Dryer, Büchi 190), the polymer from Example 1 or 2 in toluene solution is atomized at various temperatures and at different concentrations under the following conditions, as described in the following Examples 3–6.

| | |
|---|---|
| Flow rate (N$_2$) | 500 Nl/h |
| Delivery pump rate | 4 ml/min |
| Aspirator | 10 |
| N$_2$ upstream pressure | 150 mbar |
| Filter pressure | 32.5 mbar |

EXAMPLE 3

3% strength solution of the polymer from Example 1 in toluene inlet temperature: 185° C., outlet temperature: 105° C. mean diameter of the resuspended particles d$_n$=1.0 μm; d$_w$/d$_n$=1.7

EXAMPLE 4

2% strength solution of the polymer from Example 2 in toluene inlet temperature: 150° C., outlet temperature: 92° C. mean diameter of the particles resuspended in water with 2% of Tween 20 d$_n$=1.55 μm

EXAMPLE 5

4% strength solution of the polymer from Example 2 in toluene inlet temperature: 160° C., outlet temperature: 92° C. mean diameter of the resuspended particles d$_n$=1.2 μm; d$_w$/d$_n$: 1.6

EXAMPLE 6

4% strength solution of the polymer from Example 2 in toluene inlet temperature: 208° C., outlet temperature: 119° C. mean diameter of the resuspended particles d$_n$=1.0 μm; d$_w$/d$_n$: 1.7

C. Production of the films according to the invention

EXAMPLE 7

By co-extrusion and subsequent stepwise orienting in the longitudinal and transverse directions, an opaque three-layer film of symmetrical structure was produced with an overall thickness of 40 μm. The top layers each had a thickness of 0.6 μm.

| A base Layer (= vacuole-containing layer): | |
|---|---|
| 84.85% by weight | of highly isotactic polypropylene made by Solvay under the brand name ®Eltex PHP 405 |
| 15.0% by weight | of a masterbatch composed of 20% by weight of hollow bodies from Example 3 and 80% by weight of ®Eltex PHP 405 (= 3% by weight of hollow bodies in the layer) |
| 0.15% by weight | of N,N-bis-ethoxyalkylamine |
| B top layers: | |
| 98.77% by weight | of random ethylene/propylene copolymer having a C$_2$ content of 4.5% by weight |
| 0.33% by weight | of SiO$_2$ of a mean particle size of 2 μm as anti-blocking agent |
| 0.90% by weight | of polydimethylsiloxane having a vis- cosity of 30,000 mm$^2$/s |

The production conditions in the individual process steps were:

| Extrusion: | | | |
|---|---|---|---|
| | Temperatures | A layer | 240° C. |
| | | B layers | 240° C. |
| | Temperature of the draw-off roller | 30° C. | |
| Longitudinal stretching: | | | |
| | Temperature | 130° C. | |
| | Longitudinal stretching ratio | 6.5 | |
| Transverse stretching: | | | |
| | Temperature | 170° C | |
| | Transverse stretching ratio | 8.5 | |
| Fixing: | | | |
| | Temperature | 140° C. | |
| | Convergence | 15% | |

The film produced in this way is opaque and has a density of 0.6 g/cm$^3$.

EXAMPLE 8

For comparison with Example 7, the hollow bodies from Example 5 were used in the base layer. The film produced had an opaque appearance and a density of 0.58 g/cm$^3$.

EXAMPLE 9

For comparison with Example 7, the hollow bodies from Example 6 were used in the base layer. The film produced had an opaque appearance and a density of 0.6 g/cm$^3$.

EXAMPLE 10

For comparison with Example 7, the hollow bodies from Example 4 were used in the base layer. The film produced had an opaque appearance and a density of 0.56 g/cm$^3$.

COMPARATIVE EXAMPLE 11

For comparison with Example 7, 4.3% of ®MP 52253 made by Multibase was added to the base layer. The film produced in this way was opaque and had a density of 0.78 g/cm$^3$.

The following measurement methods were used for characterizing the raw materials, the hollow bodies and the films:

Melt index

The melt index was measured analogously to DIN 53 735 at 21.6N load and 230° C.

Melting point

DSC measurement, maximum of the melting curve, heating-up rate 20° C./minute.

Density

The density is determined according to DIN 53 479, method A.

Gloss

The gloss was determined according to DIN 67 530. The reflector value was measured as the optical parameter for the surface of a film. Analogously to the standards ASTM-D 523-78 and ISO 2813, the angle of incidence was set to 60° or 85°. A light beam strikes the planar test surface under the set angle of incidence and is reflected and/or scattered by the surface. The light beams striking the photo-electronic receiver are indicated as a proportional electrical value. The measured value is dimensionless and must be reported together with the angle of incidence.

Opacity and whiteness

The opacity and the whiteness are determined by means of the electric remission photometer "ELREPHO" made by Zeiss, Oberkochem (Germany), standard light type C, 2° normal observer. The opacity is determined according to DIN 53 146. The whiteness is defined as WG=RY+3RZ−3RX.

WG=whiteness; RY, RZ, RX=corresponding reflection factors when using the Y, Z and X color measurement filter. A pressed piece of barium sulfate (DIN 5033, part 9) is used as a white standard. A detailed description is given, for example, in Hansl Loos "Farbmessung [Color Measurement]", Verlag Beruf und Schule, Itzehoe (1989).

Light transmission

The light transmission is measured analogously to ASTM-D 1003-77.

Mean molecular weight and dispersity of the molecular masses

The mean molecular masses ($M_w$, $M_n$) and the mean dispersity ($M_w/M_n$) of the molecular masses were determined analogously to DIN 55 672, Part 1, by means of gel permeation chromatography. In place of THF, ortho-dichlorobenzene was used as eluant. Since the olefinic polymers to be examined are insoluble at room temperature, the entire measurement is carried out at elevated temperature (~135° C.).

Glass temperature

The samples were examined by means of DSC (Differential Scanning Calorimetry). The heating-up rate was 20 K/minute. In order to eliminate the thermal history in the specimen, the specimen was first heated in the DSC apparatus to a temperature above the glass temperature $T_G$, rapidly cooled and then heated again (second heating-up). The temperature for the glass transition was taken as half the step height from the thermogram for the second heating-up.

Vicat softening point

The Vicat softening point VST/B/120 was measured according to ISO 306, DIN 53 460.

Photon correlation spectroscopy

The measurement was carried out as described in J. P. Fischer "Progress in Colloid and Polymer Science, 77, pages 180–194, 1988.

Particle size distribution

The number average $d_n$ and the weight average $d_w$ of the particle size were determined by usual mathematical methods from the particle size distribution determined by means of PCS.

While there is shown and described herein certain specific structure embodying the invention, it will be manifest to those skilled in the art that various modifications and rearrangements of the parts maybe made without departing from the spirit and scope of the underlying inventive concept and that the same is not limited to the particular forms herein shown and described.

We claim:

1. An oriented film which comprises at least one vacuole-containing layer comprising a thermoplastic matrix polymer and a vacuole-initiating filler which has initiated the formation of vacuoles of said vacuole-containing layer, wherein said vacuole-initiating filler comprises particulate hollow bodies, said particulate hollow bodies consisting essentially of an organic filler polymer which is incompatible with the thermoplastic matrix polymer wherein the film has a light transmission of about 50 to about 80%, measured according to ASTM-D 1003-77.

2. The film as claimed in claim 1, wherein the film has at least one further layer.

3. The film as claimed in claim 2, wherein the vacuole-containing layer comprises about 1 to about 30% by weight of the particulate hollow bodies, based on the weight of the vacuole-containing layer.

4. The film as claimed in claim 2, wherein the film includes a base layer and a top layer and, optionally, an interlayer, and the vacuole-containing layer forms the base layer, an interlayer or a top layer of the film.

5. The film as claimed in claim 2, wherein the further layer comprises about 75 to 100% by weight of an olefinic polymer.

6. The film as claimed in claim 2, wherein the film includes a base layer and a top layer and, optionally, an interlayer, and the further layer forms the base layer, an interlayer or a top layer of the film.

7. The film as claimed in claim 2, wherein the further layer comprises particulate hollow bodies as a vacuole-initiating filler and has vacuoles.

8. The film as claimed in claim 2, wherein the further layer comprises a pigment.

9. The film as claimed in claim 2, wherein the film includes a base layer and a top layer and, optionally, an interlayer, and wherein the base layer, an interlayer and/or a top layer comprises a polyolefin which has been degraded by a peroxide mechanism.

10. The film as claimed in claim 1, wherein the vacuole-containing layer comprises at least about 60% by weight, of a thermoplastic matrix polymer, each based on the weight of the vacuole-containing layer.

11. The film as claimed in claim 3, wherein the vacuole-containing layer comprises about 70 to about 99% of a polyolefin, based on the weight of the vacuole-containing layer.

12. The film as claimed in claim 1, wherein the thermoplastic matrix polymer is polypropylene.

13. The film as claimed in claim 1, wherein the vacuole-containing layer comprises at most about 40% by weight of the particulate hollow bodies, based on the weight of the vacuole-containing layer.

14. The film as claimed in claim 1, wherein the particulate hollow bodies are substantially spherical.

15. The film as claimed in claim 1, wherein the particulate hollow bodies have an organic polymer skin having an inner surface defining the enclosed hollow interior of the hollow body and an outer surface having about 1 to about 20 concave surface segments.

16. The film as claimed in claim 15, wherein the number and inward curvature of said concave surface segments are large enough so that the inner surfaces of the segments are in contact with each other, thereby forming an essentially collapsed body with a folded surface skin.

17. The film as claimed in claim 1, wherein at least about 90% of the particulate hollow bodies have a maximum particle diameter in the range from about 0.2 to about 20 $\mu$m.

18. The film as claimed in claim 17, wherein the particle diameter is in the range from about 0.3 to about 7 $\mu$m.

19. The film as claimed in claim 1, wherein the incompatible, organic filler polymer is syndiotactic polystyrene, polyphenylene sulfide, polyetherketone, polyamide, polyethylene terephthalate, polybutylene terephthalate, polyaramide, polyimide, a halogenated polymer, an amorphous or partially crystalline cycloolefin polymer or a metathesis polymer.

20. The film as claimed in claim 1, wherein the vacuole-containing layer additionally comprises a pigment.

21. The film as claimed in claim 1, wherein the vacuole-containing layer additionally comprises $TiO_2$.

22. The film as claimed in claim 1, wherein the density of the film is at most about 1.7 $g/cm^3$.

23. The film as claimed in claim 1, wherein the density of the film is from about 0.4 to about 1.59 $g/cm^3$.

24. The film as claimed in claim 1, wherein the film consists essentially of the vacuole-containing layer.

25. The process for producing the film as claimed in claim 1, comprising compressing said incompatible, organic filler polymer or said thermoplastic matrix polymer or a blend of said polymers in an extruder and heating to form a melt or melts, extruding the melt or melts through a sheet die, drawing off the film thus obtained on one or more rollers and then orienting the film and, optionally, thermofixing and optionally surface-treating, wherein the extrusion temperature is below the glass temperature of the incompatible, organic filler polymer.

26. The film as claimed in claim 1, wherein the density of the film is from about 0.4 to about 1.5/$cm^3$.

27. The film as claimed in claim 1, wherein said film has increased stiffness as compared to as vacuole-containing film containing the same content of solid spherical polybutylene terephthalate or $CaCO_3$ vacuole-inducing filler.

* * * * *